(12) United States Patent
Shinjo et al.

(10) Patent No.: US 8,124,791 B2
(45) Date of Patent: Feb. 28, 2012

(54) ACTIVE ENERGY RAY CURABLE LIQUID COMPOSITION AND LIQUID CARTRIDGE

(75) Inventors: Kenji Shinjo, Yokohama (JP); Norio Ohkuma, Machida (JP); Shoji Shiba, Yokohama (JP); Hikaru Ueda, Kawasaki (JP); Hiroe Ishikura, Kawasaki (JP); Shinsuke Tsuji, Yokohama (JP); Yoshikazu Saito, Kawasaki (JP); Kouji Harada, Kawasaki (JP); Yuichiro Kanasugi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 12/530,720

(22) PCT Filed: Mar. 25, 2008

(86) PCT No.: PCT/JP2008/056266
§ 371 (c)(1),
(2), (4) Date: Sep. 10, 2009

(87) PCT Pub. No.: WO2008/120772
PCT Pub. Date: Oct. 9, 2008

(65) Prior Publication Data
US 2010/0094024 A1    Apr. 15, 2010

(30) Foreign Application Priority Data
Mar. 29, 2007   (JP) .................. 2007-086761

(51) Int. Cl.
*C07D 403/14* (2006.01)
(52) U.S. Cl. ........................ 548/521; 548/520
(58) Field of Classification Search .............. 548/521, 548/520
See application file for complete search history.

(56) References Cited

U.S. PATENT DOCUMENTS

| | | | |
|---|---|---|---|
| 5,091,542 A * | 2/1992 | Ahlem et al. ................. 548/521 |
| 5,593,757 A | 1/1997 | Kashiwazaki et al. ........ 428/195 |
| 5,658,376 A | 8/1997 | Noguchi et al. ........... 106/31.43 |
| 5,681,643 A | 10/1997 | Noguchi et al. ............ 428/192 |
| 5,837,047 A | 11/1998 | Twardowska et al. ....... 106/38.3 |
| 5,851,280 A | 12/1998 | Belmont et al. .............. 106/472 |
| 6,114,020 A | 9/2000 | Misuda et al. ................. 428/212 |
| 6,391,440 B1 | 5/2002 | Yoshino et al. ............... 428/342 |
| 6,410,611 B1 | 6/2002 | Sakurai et al. ................. 522/103 |
| 6,670,000 B1 | 12/2003 | Misuda et al. ............... 428/32.1 |
| 6,730,375 B2 | 5/2004 | Moriya et al. ............. 428/32.37 |
| 6,783,229 B1 | 8/2004 | Inamoto et al. ............... 347/105 |
| 6,811,839 B2 | 11/2004 | Hiro et al. ..................... 428/32.3 |
| 6,966,944 B2 | 11/2005 | Shimomura et al. ....... 106/31.43 |
| 7,208,032 B2 | 4/2007 | Hakamada et al. ........ 106/31.27 |
| 7,297,194 B2 | 11/2007 | Shinjo et al. .............. 106/31.27 |
| 7,517,073 B2 | 4/2009 | Nito et al. ..................... 347/100 |
| 7,517,074 B2 | 4/2009 | Hakamada et al. ........... 347/100 |
| 2002/0007042 A1 | 1/2002 | Herr et al. ..................... 528/322 |
| 2002/0065335 A1 | 5/2002 | Noguchi et al. ................ 522/84 |
| 2004/0110858 A1 | 6/2004 | Biro et al. ..................... 522/100 |

FOREIGN PATENT DOCUMENTS

| | | |
|---|---|---|
| EP | 0 446 071 A2 | 9/1991 |
| EP | 0 878 482 A1 | 11/1998 |
| EP | 0 969 065 A2 | 1/2000 |
| EP | 1 188 806 A2 | 3/2002 |
| EP | 0 709 438 B1 | 4/2003 |
| JP | 3-185017 | 8/1991 |
| JP | 4-50261 | 2/1992 |
| JP | 6-228091 | 8/1994 |
| JP | 08-143802 | 6/1996 |
| JP | 08-165441 | 6/1996 |
| JP | 08-209048 | 8/1996 |
| JP | 10-140065 | 5/1998 |
| JP | 11-124403 | 5/1999 |
| JP | 2000-117960 | 4/2000 |
| JP | 2000-144041 | 5/2000 |
| JP | 2001-163925 | 6/2001 |
| JP | 2001-348375 | 12/2001 |
| JP | 2002-020721 | 1/2002 |
| JP | 2002-187918 | 7/2002 |
| JP | 2003-128731 | 5/2003 |
| JP | 2003-165927 | 6/2003 |

(Continued)

OTHER PUBLICATIONS

Cheronis et al. J. Med. Chem. 1992, 35, 1563-1572.*
Oct. 8, 2009 International Preliminary Report on Patentability and Written Opinion in International Application No. PCT/JP2008/056266.
International Search Report and Written Opinion in International Application No. PCT/JP2008/056266 dated May 13, 2008.

*Primary Examiner* — Joseph Kosack
*Assistant Examiner* — Matthew Coughlin
(74) *Attorney, Agent, or Firm* — Fitzpatrick, Cella, Harper & Scinto

(57) ABSTRACT

The invention provides an active energy ray curable liquid composition containing a compound represented by a general formula (I):

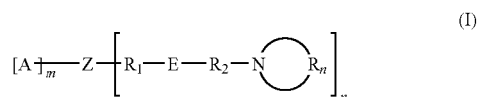

(I)

wherein A is a hydrogen atom or a monovalent organic residue which may be substituted, $R_1$ and $R_2$ are, independently of each other, a divalent organic group which may be substituted, E is an amide bond, $R_n$ is a cyclic linking group having a carbonyl group and an unsaturated carbon-carbon bond adjacent to the carbon atom of the carbonyl group, m is a number of 0 or greater, n is a number of 2 or greater, m+n is 3, and Z is a secondary or tertiary amino bond structure, with the proviso that the amino bond may be a salt of a secondary or tertiary amine, and a liquid cartridge.

2 Claims, 1 Drawing Sheet

FOREIGN PATENT DOCUMENTS

| | | |
|---|---|---|
| JP | 2003-206323 | 7/2003 |
| JP | 2005-023101 | 1/2005 |
| JP | 2005-327873 | 11/2005 |
| JP | 2007-119449 | 5/2007 |
| JP | 2007-131716 | 5/2007 |
| WO | WO 99/48928 | 9/1999 |
| WO | WO 2007/037521 | 4/2007 |

* cited by examiner

ACTIVE ENERGY RAY CURABLE LIQUID COMPOSITION AND LIQUID CARTRIDGE

TECHNICAL FIELD

The present invention relates to a novel active energy ray curable liquid composition typified by a photo-curable ink jet ink and a liquid cartridge containing the same.

BACKGROUND ART

It has heretofore been known to applying a liquid composition on to a recording medium and applying thereto with light including active energy rays to cure a curable substance in the liquid composition, thereby forming a cured film to form an image. For example, a liquid composition (curable emulsion paint) obtained by emulsifying and dispersing a non-aqueous active energy ray curable substance in an aqueous vehicle and adding a coloring material to this emulsion is applied to a medium, and the liquid composition is then irradiated with ultraviolet rays to form an image.

In recent years, such an active energy ray curable liquid composition and various paints using the liquid composition have been widely applied to graphic art, sign art, production of display panels, label recording, package recording and production of electron circuit boards.

Among these, it has been known to apply such a liquid composition containing the active energy ray curable substance as an ink to an ink jet recording method. When the active energy ray curable liquid composition is used in such an ink jet recording method, it is considered that a non-aqueous or aqueous material is used as a curable substance used therein. When the non-aqueous curable substance is used, the ink is roughly classified into 2 types. One of the types is the so-called oil ink obtained by dispersing a pigment in an organic solvent such as toluene or methyl ethyl ketone. The other of the types is the so-called 100% curable ink (non-solvent ink) containing a liquid monomer or oligomer, and a pigment dispersion without using such an organic solvent as described above.

However, when such an oil ink as described above is used, it is necessary to sufficiently care for environment because the organic solvent is easy to volatilize off in the air. The 100% curable ink is liable to cause irregularities between a recorded portion and a non-recorded portion because all the ink components applied on to a recorded medium have to be converted to a cured film. It is thus difficult to give a glossy feeling to an image. Therefore, it is difficult under the circumstances to use such ink to applications in which high image quality is required.

On the other hand, when the aqueous curable substance is used, an aqueous solvent containing water as a main component is used as a solvent, so that a burden on environment by volatilization of the solvent is relatively small. It is also possible to reduce the occurrence of such irregularities as caused in the 100% curable ink. From such reasons, it is extremely useful to use the active energy ray curable liquid composition using the aqueous curable substance in the ink jet recording method. From such circumstances, there has been a demand for development of aqueous active energy ray curable liquid compositions and, at the same time, development of various hydrophilic reactive resins applicable to the liquid compositions.

Under the circumstances, hydrophilic curable substances having both acidic group and (meth)acryloyl group or vinyl group are known as one example of aqueous active energy ray curable substances. Examples of such substances include esters of succinic anhydride and 2-hydroxyethyl (meth)acrylate, esters of orthophthalic anhydride and 2-hydroxyethyl (meth)acrylate, and vinylnaphthalenesulfonic acid.

Curable substances to which hydrophilicity has been given by a polyethylene oxide chain are known as an example of industrially produced water-soluble compounds having 2 or more polymerizable functional groups in their molecules. Examples of such compounds include (meth)acrylates of polyhydric alcohols, such as diethylene glycol di(meth)acrylate and tetraethylene glycol di(meth)acrylate.

Polyfunctional hydrophilic curable substances are also disclosed in Japanese Patent Application Laid-Open No. H08-165441. The compounds disclosed therein are used for the purpose of increasing the number of hydroxyl groups in a molecule as a technique for imparting hydrophilicity.

(Meth)acrylates of hydrophilic polyepoxides derived from polyalcohols are also disclosed in Japanese Patent Application Laid-Open Nos. 2000-117960 and 2002-187918. The compounds disclosed therein can satisfy curability by active energy rays and physical properties of cured materials to some extent, and the viscosities of aqueous solutions of the compounds also satisfy the level required of ink-jet inks.

Further, compositions for energy ray curable powder paints having an ethylenically unsaturated group containing compound in addition to a spiro ring containing (meth)acrylate compound are disclosed in Japanese Patent Application Laid-Open No. 2003-165927.

In addition, active energy ray curable ink-jet ink compositions containing an amino group-containing polyfunctional (meth)acrylate compound are disclosed in Japanese Patent Application Laid-Open No. 2005-327873.

However, it has not been sufficient in some cases to use such above-mentioned compounds as described in the various prior art documents as main materials for such active energy ray curable liquid compositions as applicable to the ink jet recording method. In, for example, the compounds having one polymerizable functional group in one molecule, in many cases, a polymerization rate is slow, and the crosslinking degree of a cured film is low because such a compound has only one polymerizable functional group in its molecule. Therefore, a liquid composition using such a compound hardly becomes a main material for the purpose of the present invention because curability and properties of the cured film are poor in view of the requirement of higher durability in recent years.

According to investigation by the present inventors, it has been found that the water-soluble compounds which have 2 or more polymerizable functional groups in one molecule and are industrially produced involve the following problem. More specifically, these compounds are poor in water solubility when the ethylene oxide chain is short. When the ethylene oxide chain is long to the contrary, the water solubility is achieved, but properties of the cured film, particularly hardness, adhesion and stickiness, are not sufficient in some cases.

The compounds described in Japanese Patent Application Laid-Open No. H08-165441 have water solubility and are curable by active energy rays. However, the compounds are used in ink receiving layers for recording media, and whether such a compound can be applied to the object of the present invention or not is unknown. According to investigation by the present inventors, the compounds involve a problem that when a liquid composition containing such a compound is prepared, its viscosity becomes too high, and so a range of application is limited.

According to investigation by the present inventors, the compounds disclosed in Japanese Patent Application Laid- Open Nos. 2000-117960 and 2002-187918, such as (meth) acrylates of hydrophilic polyepoxides involve the following problem. More specifically, when such an aqueous curable substance having a (meth)acrylate group is used as a material for aqueous inks, the following problems may have occurred in some cases. A dye dissolved in an aqueous medium by an anionic group, or a pigment dispersion obtained by dispersing a pigment in an aqueous medium by an anionic group is widely used as a coloring material for an aqueous ink. On the other hand, when such an aqueous curable substance as described above is contained in the aqueous ink, the pH of the aqueous ink may be lowered to an acid range in some cases attending on the formation of acrylic acid by hydrolysis of the (meth)acrylate group. In such a condition, a problem may be caused from the viewpoint of storage stability of the aqueous ink in some case, because the dye stably existing in the ink in itself at the original pH adjusted to an alkaline or neutral range precipitates or the pigment dispersion aggregates or precipitates. In addition, a problem may be caused from the viewpoint of ejection stability in some cases because the curable substance in the ink forms insoluble matter by an unexpected reaction, which is particularly marked in an ink jet recording method that the ink is ejected by the action of thermal energy.

The compound described in Japanese Patent Application Laid-Open No. 2003-165927 is used in the composition for powder paints. Whether the compound can be applied to a liquid composition or not and whether it is water-soluble or not are unknown. In addition, whether sufficient curability can be achieved or not is also unknown because the publication describes that a monofunctional maleimide compound or the like is preferred.

The compound described in Japanese Patent Application Laid-Open No. 2005-327873 is used in ink-jet liquid inks requiring no solvent, but involves problems of stability of the aqueous ink and ejection stability like Japanese Patent Application Laid-Open Nos. 2000-117960 and 2002-187918 because the compound has a (meth)acrylate structure.

DISCLOSURE OF THE INVENTION

Accordingly, it is a first object of the present invention to provide an active energy ray curable liquid composition containing at least a compound excellent in water solubility, active energy ray curability and stability when used as a material for forming an aqueous ink. Specifically, the object is to provide an active energy ray curable liquid composition containing a compound which exhibits sufficient water solubility and quickly and fully cured by active energy rays, providing a cured material having the following excellent properties and being excellent in stability to heat and storage. The cured material formed by the active energy ray curable liquid composition is excellent in strength and adhesion.

A second object of the present invention is to provide a liquid cartridge, which has the above-described effect and is high in practical value, by using the active energy ray curable liquid composition and being equipped with a liquid storage portion storing this liquid composition.

The above objects are achieved by the present invention described below. According to a first embodiment of the present invention, there is thus provided an active energy ray curable liquid composition comprising a compound represented by the following general formula (I):

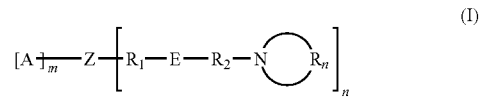

wherein A is a hydrogen atom or a monovalent organic residue which may be substituted, $R_1$ and $R_2$ are, independently of each other, a divalent organic group which may be substituted, E is an amide bond, $R_n$ is a cyclic linking group having a carbonyl group and an unsaturated carbon-carbon bond adjacent to the carbon atom of the carbonyl group, m is a number of 0 or greater, n is a number of 2 or greater, m+n is 3, and Z is a secondary or tertiary amino bond structure represented by the following formula, with the proviso that the amino bond may be a salt of a secondary or tertiary amine.

According to a second embodiment of the present invention, there is also provided a liquid cartridge comprising a liquid storage portion storing the active energy ray curable liquid composition.

According to the first embodiment of the present invention, an active energy ray curable liquid composition excellent in performance can be provided. In particular, an aqueous active energy ray curable liquid composition in which the water solubility, curability and stability of components making up the liquid composition are very excellent can be provided. Therefore, the liquid composition extremely suitably applicable to an ink jet recording method and excellent in ejection stability and storage stability is provided, and an image excellent in fixing ability and fastness properties such as highlighter resistance can be stably formed. According to the second embodiment of the present invention, a liquid cartridge equipped with a liquid storage portion storing the active energy ray curable liquid composition, which can achieve the above-described excellent effect, and having a high practical value is provided.

BEST MODE FOR CARRYING OUT THE INVENTION

Figure 1:
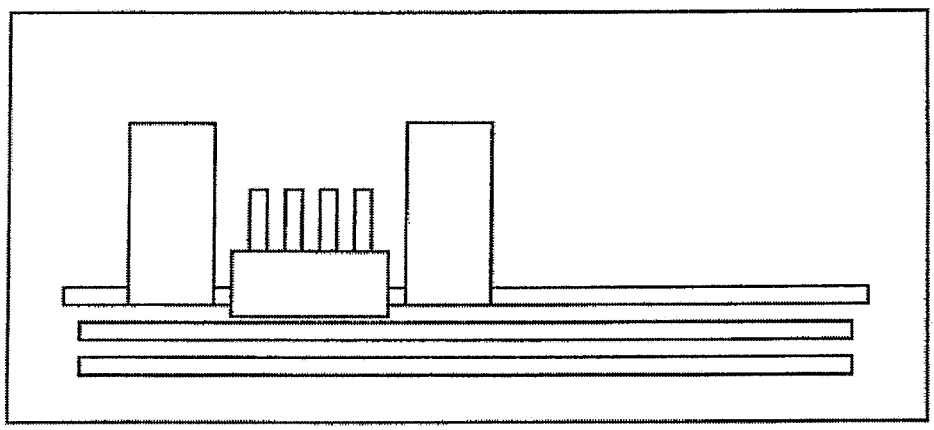
FIG. 1 schematically illustrates a front view of an ink jet recording apparatus suitably usable in formation of images with the liquid composition according to the present invention.

Further features of the present invention will become apparent from the following description of exemplary embodiments with reference to the attached drawing. The present invention will hereinafter be described in detail by the preferred embodiments. Needless to say, the scope of the present invention is not limited to the embodiments. The present inventors have carried out an extensive investigation in deep view of the above-described background art. As a result, the compounds represented by the general formula (I) have been found. The present inventors have found that marked effects which cannot easily expected for the objects of the present invention are developed for the first time by providing the active energy ray curable liquid composition containing the compound represented by the general formula (I), thus leading to completion of the present invention.

In the course of the investigation, the present inventors have applied the active energy ray curable liquid composition of the present invention containing the compound represented by the general formula (I) to an ink jet recording method and evaluated the ejection stability thereof and a cured film. As a result, the polymerization rate and the crosslinking degree of the cured film were satisfactory, the cured film was been little in stickiness, the formation of insoluble matter by an unexpected reaction was within a permissible range, change in pH was little, and storage stability was good. In other words, it has been confirmed that the active energy ray curable liquid composition exhibits excellent overall performance.

The reason why such excellent performance is developed is not clearly known. However, the present inventors presume the reason to be as follows. First, with respect to the water solubility, the main cause is presumed to be attributable to the fact that the amide bond that this compound has is hydrophilic, and the portion of the amino bond also has high hydrophilicity.

The good curability is presumed to be developed by such factors as the following structural feature of the compound represented by the general formula (I). First, the compound has a carbonyl group and a cyclic linking group $R_n$ having an unsaturated carbon-carbon bond adjacent to the carbon atom of the carbonyl group, and further factors are supposed to be that this structure has polymerizability and is polyfunctional, that crosslink density is liable to be structurally increased due to the structure to form a dense cured film, and in addition, that this compound has the amide bond high in hydrogen-bonding ability, while the basic skeleton of the bonding residual group has a amino compound structure which accelerates radical polymerizability.

The factors of the stability in the case where the liquid composition is provided as an aqueous ink is presumed to be as follows. The compound represented by the general formula (I) does not have a bonding style with relatively poor stability (for example, acrylate group) in the interior of the compound, and the amino group structure exhibits basic nature. Since the compound has such features as described above, in particular, a dye dissolved in an aqueous medium by an anionic group or a pigment dispersion obtained by dispersing a pigment in an aqueous medium by an anionic group can be retained in a stably dissolved or dispersed state when such a dye or pigment dispersion exists in combination with the compound. As a result, it is presumed that when an active energy ray polymerizable substance according to the present invention is used as an aqueous ink, excellent storage stability is achieved.

The present invention will now be described in more detail based on specific examples. The active energy ray polymerizable substance according to the present invention is favorably hydrophilic. The condition that the compound is hydrophilic in the present invention means that the compound is in any state of the following states (1) to (3):
(1) The compound is soluble in an organic solvent miscible with water, and the organic solvent is water-soluble.
(2) The compound is water-insoluble, but is subjected to such a treatment that the compound becomes emulsifiable in water.
(3) The compound is water-soluble.

In the present invention, the water solubility of the compound represented by the general formula (I) is favorably such that the compound is completely dissolved by 1% by mass or more in pure water at 25° C. under a pressure of 1 atm.

Examples of the compounds represented by the general formula (I) that characterizes the active energy ray polymerizable substance according to the present invention will hereinafter be described. In the present invention, among the compounds represented by the general formula (I), a compound represented by the following general formula (I') is particularly favorably used.

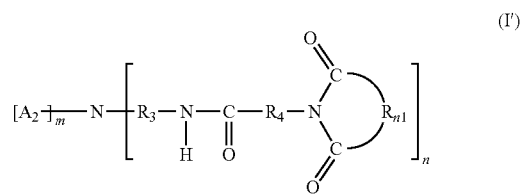

In the formula (I'), —$R_3$— is represented by the following general formula ($R_3$), and p in the formula (R3) is a number of 0 to 5.

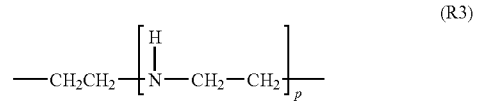

$R_4$ in the formula (I') is an alkylene group having 1 to 6 carbon atoms, which may be substituted, and Rn1 is a cyclic linking group having a carbonyl group and an unsaturated carbon-carbon bond adjacent to the carbon atom of the carbonyl group. $A_2$ in the formula (I') is a hydrogen atom or the following general formula (A2), and p in the general formula (A2) is a number of 0 to 5.

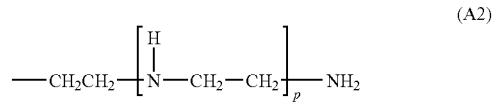

m in the formula (I') is a number of 0 or greater, n is a number of 2 or greater, and m+n is 3.

Rn1 in the formula (I') is desirably a structure represented by any of the following structural formulae (II), (III) and (IV):

Among the compounds suitably used in the present invention and represented by the general formulae (I) and (I'), preferred compounds are such that [A] in the general formula (I) or (I') is a hydrogen atom or a group represented by the following general formula [A1]. n in the general formula [A1] is a number of 0 to 5.

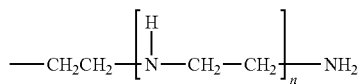

[Z] in the general formula (I) is a bonding group, and the bonding group is such that one or more bonding groups are removed from an amino group and is a secondary or tertiary amino bond structure. The amino bond may be a salt of a secondary or tertiary amine. In the present invention, it is more favorable that [Z] is a tertiary amino bond structure.

Exemplified Compound 1

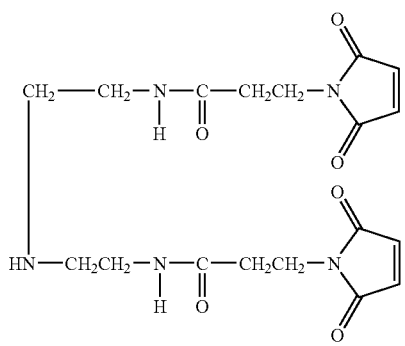

Exemplified Compound 2

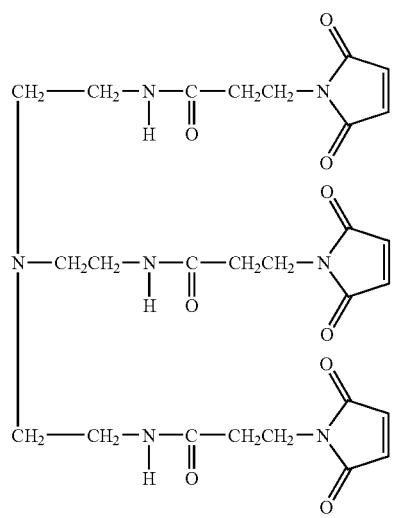

Exemplified Compound 3

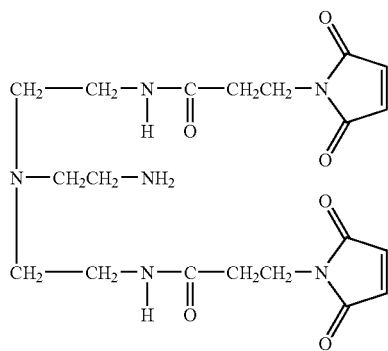

Exemplified Compound 4

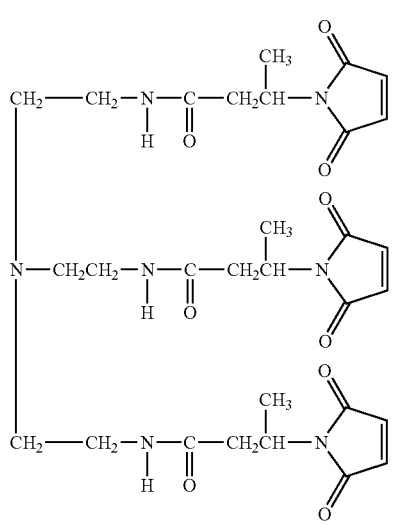

Exemplified Compound 5

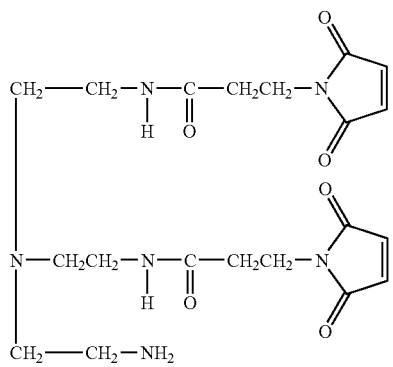

Exemplified Compound 6
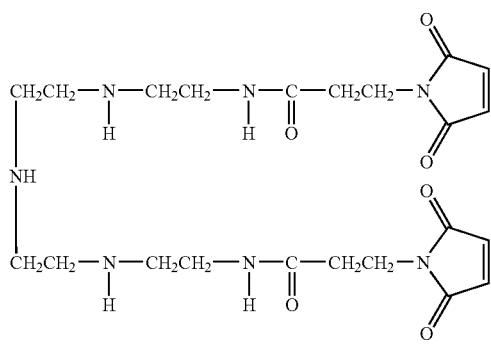
Exemplified Compound 9
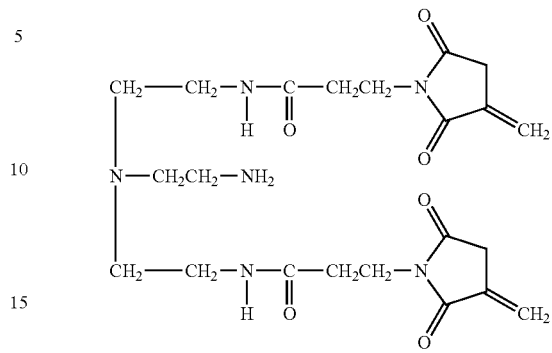
Exemplified Compound 7
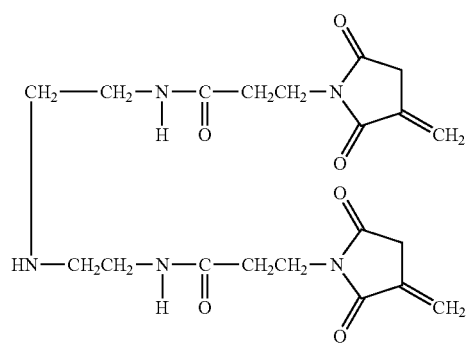
Exemplified Compound 10
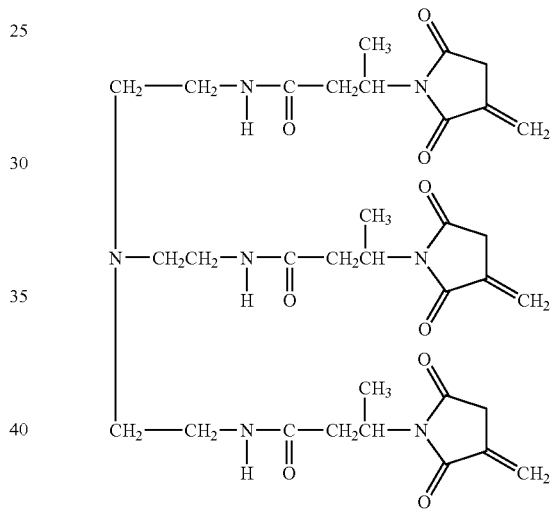
Exemplified Compound 8
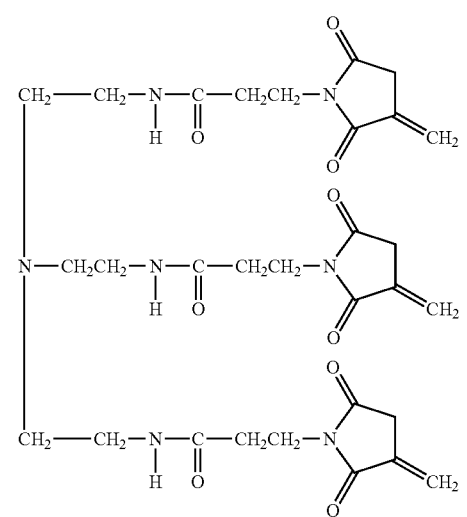
Exemplified Compound 11
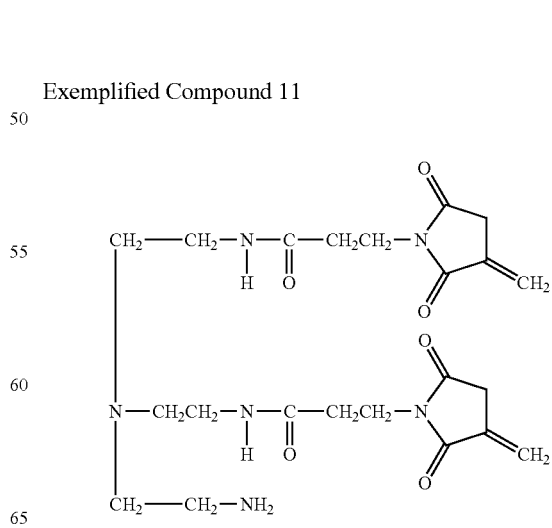

Exemplified Compound 12

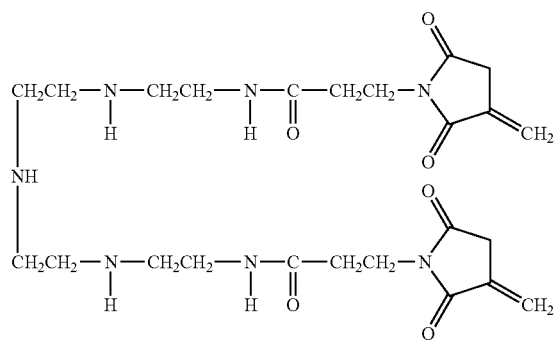

Exemplified Compound 13

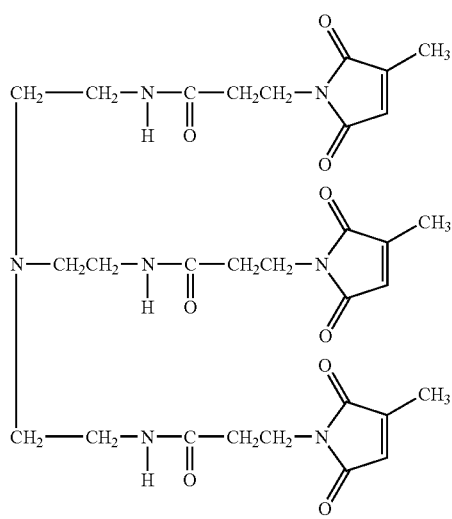

The active energy ray curable substance (polymerizable substance) represented by the general formula (I) described above can be prepared according to, for example, such a process as described below. First, aminocarboxylic acid is subjected to a condensation and ring-closing reaction with maleic anhydride or itaconic anhydride, thereby obtaining a maleimide carboxylic acid derivative or itaconamide carboxylic acid derivative. This product is further subjected to a dehydration condensation reaction with a polyfunctional amino compound, whereby the intended imide compound can be obtained. Needless to say, the preparation process of the active energy ray polymerizable substance is not limited thereto.

The active energy ray curable liquid composition according to the present invention may contain water to use it as an aqueous composition. The concentration in this case varies according to its uses and styles and cannot be mentioned in general. However, the concentration is favorably 1% by mass or more, more favorably 3% by mass or more. The concentration is also favorably 95% by mass or less, more favorably 70% by mass or less, still more favorably 60% by mass or less. The polymerizable substance may not be completely water-solubilized and emulsified and dispersed suitably using a publicly known dispersion technique to use it as an emulsion. Likewise, various encapsulation techniques may also be applied.

The active energy ray curable liquid composition according to the present invention may contain a coloring material. In such a case, the liquid composition according to the present invention may be used as an ink. The constitution in such a case and coloring materials used will be described.

The active energy ray curable liquid composition according to the present invention is applied to an ink containing a coloring material, whereby the liquid composition can be used as a colored active energy ray curable ink curable by irradiation of active energy rays. As the coloring material used in this case, is favorably used a pigment dispersion obtained by uniformly dispersing a pigment in an aqueous medium. As the pigment dispersion, may be suitably used all of aqueous gravure inks, aqueous pigment dispersions for writing utensils and conventionally known pigment dispersions used for ink-jet inks. Among others, a pigment dispersion obtained by stably dispersing a pigment in an aqueous medium by an anionic group is extremely favorable.

As the pigment dispersion with the pigment stably dispersed in the aqueous medium by the anionic group, may be used such pigment dispersions as described in the following publications. The pigment dispersions are disclosed in, for example, Japanese Patent Application Laid-Open Nos. H08-143802, H08-209048 and H10-140065, and U.S. Pat. Nos. 5,837,047 and 5,851,280. In the liquid composition according to the present invention, such various pigment dispersions as described in these publications may be used as coloring materials thereof.

Examples of pigments used include carbon black and organic pigments. Examples of carbon black include furnace black, lamp black, acetylene black and channel black. Needless to say, conventionally known carbon black pigments may also be used in addition to these carbon black pigments. Magnetic fine particles such as magnetite and ferrite, and titanium black may also be used as pigments.

As the organic pigments, may be used, for example, the following pigments: azo pigments such as Toluidine Red and Hansa Yellow; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow and Benzimidazolone Orange; and pyranthrone pigments such as Pyranthrone Red and Pyranthrone Orange.

When applicable organic pigments are indicated by COLOR INDEX (C.I.) numbers, the following pigments may be used. C.I. Pigment Yellow: 12, 13, 14, 17, 20, 24, 55, 74, 83, 86, 93, 97, 98, 109, 110, 117, 120, 125, 128, 137, 138 and 139; C.I. Pigment Yellow: 147, 148, 150, 151, 153, 154, 155, 166, 168, 180 and 185; C.I. Pigment Orange 16, 36, 43, 51, 55, 59, 61 and 71; C.I. Pigment Red: 9, 48, 49, 52, 53, 57, 97, 122, 123, 149, 168, 175, 176, 177, 180, 192, 202, 209, 215, 216 and 217; C.I. Pigment Red: 220, 223, 224, 226, 227, 228, 238, 240, 254, 255 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown: 23, and 26. Needless to say, conventionally known various organic pigments may also be used in addition to the above-described pigments.

When the above-described various pigments are used, a dispersant may be used in combination. No particular limitation is imposed on the dispersant so far as it can stably disperse the pigment in the aqueous medium. However, for example, a block polymer, random polymer or graft polymer may be used. Examples thereof include the following polymers:

Styrene-acrylic acid copolymers, styrene-maleic acid copolymers, vinylnaphthalene-acrylic acid copolymers, vinylnaphthalene-maleic acid copolymers and salts thereof; and benzyl methacrylate-methacrylic acid copolymers and salts thereof.

When the above-described various pigments are used, the so-called self-dispersion type pigments, which can be dispersed in the aqueous medium without using any dispersant by bonding an ionic group to the surfaces of pigment particles, may also be used.

The active energy ray curable liquid composition according to the present invention may also use various dyes as coloring materials. Applicable dyes are indicated by DYE COLOR INDEX (C.I.) numbers below. C.I. Acid Yellow 11, 17, 23, 25, 29, 42, 49, 61 and 71; C.I. Direct Yellow 12, 24, 26, 44, 86, 87, 98, 100, 130, 132 and 142; C.I. Acid Red 1, 6, 8, 32, 35, 37, 51, 52, 80, 85, 87, 92, 94, 115, 180, 254, 256, 289, 315 and 317; C.I. Direct Red 1, 4, 13, 17, 23, 28, 31, 62, 79, 81, 83, 89, 227, 240, 242 and 243; C.I. Acid Blue 9, 22, 40, 59, 93, 102, 104, 113, 117, 120, 167, 229, 234 and 254; C.I. Direct Blue 6, 22, 25, 71, 78, 86, 90, 106 and 199; and C.I. Direct Black 7, 19, 51, 154, 174 and 195.

The active energy ray curable liquid composition according to the present invention may also be used in the form of, so to speak, "a clear ink" without containing such a coloring material as described above. In this case, a substantially colorless and transparent film can be obtained because the ink contains no coloring material. Examples of uses of "the clear ink" include the following: an undercoat for imparting various suitabilities for image recording to recording media and an overcoat for the purpose of protecting the surface of an image formed with an ordinary ink and imparting decoration and gloss. In this case, a colorless pigment or fine particles, which do not intend to color, may also be dispersed and contained in the clear ink according to uses such as prevention of oxidation and prevention of fading. The addition of these can improve various properties such as image quality, fastness properties and handling property of the resulting recorded article in either the undercoat or the overcoat.

The liquid composition according to the present invention may contain a reactive diluent that is a generally widely known technique. Typical Examples thereof include acryloylmorpholine, N-vinylpyrrolidone, acrylamide, methylenebisacrylamide, monoacrylates of monosaccharides, monoacrylates of oligoethyleneo oxides and monoacrylates of dibasic acids.

The liquid composition according to the present invention may also contain various additives within limits not impairing its own properties for the purpose of improving various performance properties. For example, some organic solvents are added for the purpose of imparting non-volatilizability to the ink, adjusting the viscosity, adjusting the surface tension and imparting wetting tendency to a recording medium.

Organic solvents usable in the present invention are mentioned below. Into the liquid composition according to the present invention, may be added a solvent optionally selected from these organic solvents. Examples of the organic solvents include glycol ethers such as ethylene glycol monomethyl ether, diethylene glycol monoethyl ether, triethylene glycol monomethyl ether and propylene glycol monomethyl ether; and monohydric alcohols such as methanol, ethanol, propanol, butanol and pentanol.

The active energy ray curable liquid composition according to the present invention may also contain a polymerization initiator. The polymerization initiator used in this case is favorably hydrophilic for maximally utilizing reactivity.

The hydrophilic polymerization initiator used in the present invention may be any one so far as it is a compound generating a radical by active energy rays. In the present invention, at least one compound selected from the group consisting of the following general formulae (a) and (c) to (f) is favorably used.

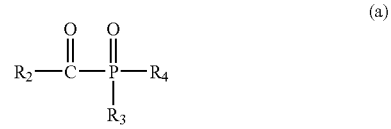

(a)

In the general formula (a), $R_2$ is an alkyl group or aryl group, $R_3$ is an alkyloxy group, phenyl group or OM, M is a hydrogen atom or alkali metal, and $R_4$ is a group represented by the following formula (b):

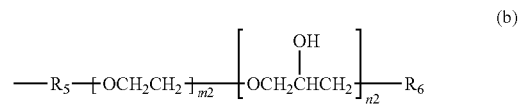

(b)

In the general formula (b), $R_5$ is $—[CH_2]_{x2}—$ (x2 being 0 or 1) or a phenylene group, m2 is 0 to 10, n2 is 0 or 1, $R_6$ is a hydrogen atom, sulfonic group, carboxyl group or hydroxyl group, or a salt thereof.

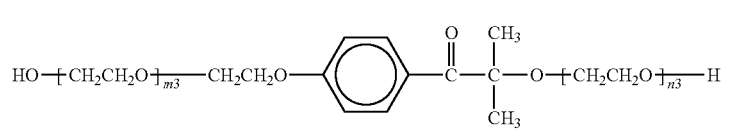

(c)

In the general formula (c), m3 is 1 or greater, n3 is 0 or greater, and m3+n3 is 1 to 8.

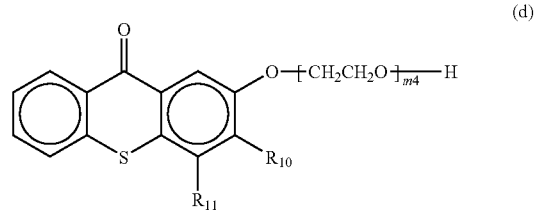

(d)

In the general formula (d), $R_{10}$ and $R_{11}$ are, independently of each other, a hydrogen atom or alkyl group, and m4 is 5 to 10.

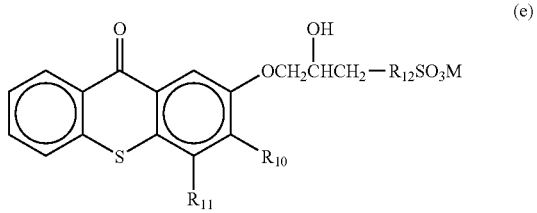

(e)

In the general formula (e), $R_{10}$ and $R_{11}$ are, independently of each other, a hydrogen atom or alkyl group, $R_{12}$ is —[CH$_2$]$_x$— (x being 0 or 1), —O—[CH$_2$]$_y$— (y being 1 or 2) or a phenylene group, and M is a hydrogen atom or alkali metal.

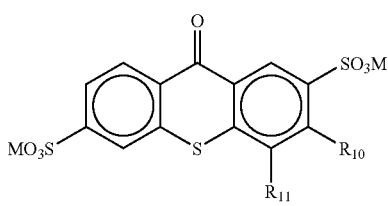

(f)

In the general formula (f), $R_{10}$ and $R_{11}$ are, independently of each other, a hydrogen atom or alkyl group, and M is a hydrogen atom or alkali metal.

Among these, compounds represented by the general formulae (a), (c) and (d) are favorably used, and compounds represented by the general formulae (a) and (c) are particularly favorably used.

The alkyl group or aryl group of $R_2$ in the general formula (a) may be substituted. Examples of such a substituent include the following substituents: halogens, alkyl groups having 1 to 5 carbon atoms, alkyloxy groups having 1 to 5 carbon atoms, groups represented by the general formula (b), a sulfonic group or salts thereof, a carboxyl group or salts thereof, and a hydroxyl group or salts thereof. When used in the present invention, $R_2$ is particularly favorably an aryl group having, as a substituent, an alkyl group having 1 to 5 carbon atoms. A counter ion forming a salt with the sulfonic group, carboxyl group or hydroxyl group is favorably that mentioned below. Examples thereof include alkali metals, alkaline earth metals and ammonium represented by HNR$_7$R$_8$R$_9$, wherein R$_7$, R$_8$ and R$_9$ are, independently of each other, a hydrogen atom, an alkyl group having 1 to 5 carbon atoms, a monohydroxyl-substituted alkyl group having 1 to 5 carbon atoms or a phenyl group.

When $R_5$ in the general formula (b) is a phenylene group, the phenylene group may be substituted. Examples of such a substituent include the following substituents: halogens, alkyl groups having 1 to 5 carbon atoms, alkyloxy groups having 1 to 5 carbon atoms, a sulfonic group or salts thereof, a carboxyl group or salts thereof, and a hydroxyl group or salts thereof. A counter ion forming a salt with the sulfonic group, carboxyl group or hydroxyl group is favorably that mentioned below. Examples thereof include alkali metals, alkaline earth metals and ammonium represented by HNR$_7$R$_8$R$_9$, wherein R$_7$, R$_8$ and R$_9$ are, independently of each other, a hydrogen atom, an alkyl group having 1 to 5 carbon atoms, a monohydroxyl-substituted alkyl group having 1 to 5 carbon atoms or a phenyl group.

$R_6$ in the general formula (b) is a hydrogen atom, a sulfonic group or a salt thereof, a carboxyl group or a salt thereof, or a hydroxyl group or a salt thereof. A counter ion forming a salt with the sulfonic group, carboxyl group or hydroxyl group is favorably that mentioned below. Examples thereof include alkali metals, alkaline earth metals and ammonium represented by HNR$_7$R$_8$R$_9$, wherein R$_7$, R$_8$ and R$_9$ are, independently of each other, a hydrogen atom, an alkyl group having 1 to 5 carbon atoms, a monohydroxyl-substituted alkyl group having 1 to 5 carbon atoms or a phenyl group.

The alkyloxy group or phenyl group of $R_3$ in the general formula (a) may be substituted. Examples of such a substituent include the following substituents: halogens, alkyl groups having 1 to 5 carbon atoms, and alkyloxy groups having 1 to 5 carbon atoms. $R_3$ is particularly favorably an alkyloxy group. In particular, —OC$_2$H$_5$ and —OC(CH$_3$)$_3$ are preferred.

The alkyl groups of $R_{10}$ and $R_{11}$ in the general formula (e) may be substituted. Examples of such a substituent include the following substituents: halogens, a sulfonic group or salts thereof, a carboxyl group or salts thereof, and a hydroxyl group or salts thereof. A counter ion forming a salt with the sulfonic group, carboxyl group or hydroxyl group is favorably that mentioned below. Examples thereof include alkali metals, alkaline earth metals and ammonium represented by HNR$_7$R$_8$R$_9$, wherein R$_7$, R$_8$ and R$_9$ are, independently of each other, a hydrogen atom, an alkyl group having 1 to 5 carbon atoms, a monohydroxyl-substituted alkyl group having 1 to 5 carbon atoms or a phenyl group.

In the general formulae (a) to (f), the alkyl groups are favorably alkyl groups having 1 to 5 carbon atoms. Specific examples thereof include, methyl, ethyl, propyl, butyl and pentyl groups. The alkyloxy groups are favorably linear or branched alkyloxy groups having 1 to 5 carbon atoms. Specific examples thereof include alkyloxy groups such as methoxy, ethoxy, propoxy, butoxy and pentoxy groups. Specific examples of the alkali metals include lithium, sodium and potassium. Specific examples of the alkaline earth metals include calcium, strontium and barium. Specific examples of the ammonium represented by HNR$_7$R$_8$R$_9$ include ammonium, dimethylethanolammonium, methyldiethanolammonium, triethanolammonium and anilinium. Needless to say, the present invention is not limited thereto.

In the present invention, compounds represented by the following formulae [B] to [D] are particularly preferred among the above-mentioned polymerization initiators.

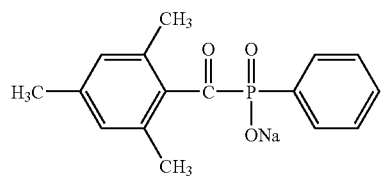

[B]

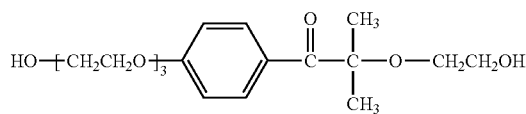

[C]

-continued

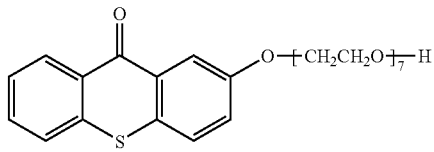

[D]

In the present invention, a polymerization initiator and a sensitizer may be used in combination, or two or more polymerization initiators may be used in combination. When two or more polymerization initiators are used in combination, it can be expected to generate an additional radical by utilizing light of a wavelength which cannot be effectively utilized by one kind of polymerization initiator.

The active energy rays used in the present invention may be any rays so far as they can cure the liquid composition. However, ultraviolet rays and electron rays are preferred. Such active energy rays can generate a radical from the polymerization initiator. When the electron rays are used, the polymerization initiator is not necessarily used.

The active energy ray curable liquid composition according to the present invention is useful as a liquid to be stored into a cartridge (liquid cartridge) equipped with a liquid storage portion or as a liquid to be charged into the liquid cartridge. The active energy ray curable liquid composition according to the present invention has an extremely excellent effect as an ejection liquid used in a recording head and an ink jet recording apparatus of a system that an ink is ejected by the action of thermal energy among ink jet recording systems.

EXAMPLES

The present invention will hereinafter be described in detail by more specific examples of the active energy ray curable liquid composition according to the present invention and comparative examples thereof. Needless to say, the present invention is not limited to the following examples.

In order to evaluate the strength, film-forming ability and adhesion of a film formed by each active energy ray curable liquid composition, a pencil hardness test was conducted in the following manner. First, the respective components shown in Tables 1 and 2 were mixed and thoroughly stirred. The resultant mixtures were then filtered under pressure through a filter having a pore size of 1.2 μm, thereby preparing liquid compositions according to EXAMPLES 1 to 20 and COMPARATIVE EXAMPLES 1 to 8. Exemplified Compounds 1, 2, 4, 8, 10 and 12 among the exemplified compounds previously described were used as polymerizable substances for Examples. As polymerizable substances for Comparative Examples were used the following Comparative Compounds 1 and 2. Incidentally, the amounts of components in each liquid composition or ink mean part or parts by mass unless expressly noted. In the present invention, recording with which the whole of an image is filled with dots of about 5 pl per pixel at a pitch of 600×600 dpi is called 100% solid.

Comparative Compound 1

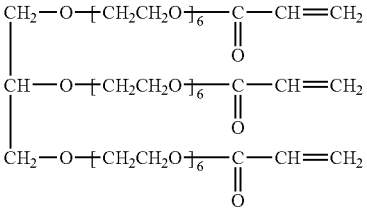

Comparative Compound 2

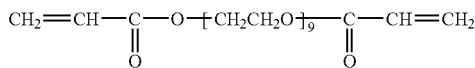

TABLE 1

Compositions of liquid compositions of EXAMPLES 1 to 10 and COMPARATIVE EXAMPLES 1 to 4 (unit: parts by mass)

| | | EXAMPLE | | | | | | | | | | COMP. EX. | | | |
| --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 1 | 2 | 3 | 4 |
| Polymerizable substance | Exemplified Compound 1 | 40 | | | | | 40 | | | | | | | | |
| | Exemplified Compound 2, 4 (*1) | | 40 | | | | | 40 | | | | | | | |
| | Exemplified Compound 8, 10 (*2) | | | 40 | | | | | 40 | | | | | | |
| | Exemplified Compound 2 | | | | 40 | | | | | 40 | | | | | |
| | Exemplified Compound 8 | | | | | 40 | | | | | 40 | | | | |
| | Comparative Compound 1 | | | | | | | | | | | 40 | | 40 | |
| | Comparative Compound 2 | | | | | | | | | | | | 40 | | 40 |
| Polymerization initiator | Exemplified Compound B | 8 | 8 | 8 | 8 | 8 | | | | | | 8 | 8 | | |
| | Exemplified Compound D | | | | | | 8 | 8 | 8 | 8 | 8 | | | 8 | 8 |
| Diluent | Acryloylmorpholine | 52 | 52 | 52 | 52 | 52 | 52 | 52 | 52 | 52 | 52 | 52 | 52 | 52 | 52 |
| Water (ion-exchanged water) | | 0 | 0 | 0 | 0 | 0 | 0 | 0 | 0 | 0 | 0 | 0 | 0 | 0 | 0 |

(*1) Exemplified Compounds 2 and 4 were used as a mixture of a mass ratio of 1:1.
(*2) Exemplified Compounds 8 and 10 were used as a mixture of a mass ratio of 1:1.

TABLE 2

Compositions of liquid compositions of EXAMPLES 11 to 20 and COMPARATIVE EXAMPLES 5 to 8 (unit: parts by mass)

| | | EXAMPLE | | | | | | | | | | COMP. EX. | | | |
|---|---|---|---|---|---|---|---|---|---|---|---|---|---|---|---|
| | | 11 | 12 | 13 | 14 | 15 | 16 | 17 | 18 | 19 | 20 | 5 | 6 | 7 | 8 |
| Polymerizable substance | Exemplified Compound 1 | 30 | | | | | 30 | | | | | | | | |
| | Exemplified Compound 2, 4 (*1) | | 30 | | | | | 30 | | | | | | | |
| | Exemplified Compound 8, 10 (*2) | | | 30 | | | | | 30 | | | | | | |
| | Exemplified Compound 2 | | | | 30 | | | | | 30 | | | | | |
| | Exemplified Compound 8 | | | | | 30 | | | | | 30 | | | | |
| | Comparative Compound 1 | | | | | | | | | | | 30 | | 30 | |
| | Comparative Compound 2 | | | | | | | | | | | | 30 | | 30 |
| Polymerization initiator | Exemplified Compound B | 4 | 4 | 4 | 4 | 4 | | | | | | 4 | 4 | | |
| | Exemplified Compound D | | | | | | 4 | 4 | 4 | 4 | 4 | | | 4 | 4 |
| Diluent | Acryloylmorpholine | 10 | 10 | 10 | 10 | 10 | 10 | 10 | 10 | 10 | 10 | 10 | 10 | 10 | 10 |
| Water (ion-exchanged water) | | 56 | 56 | 56 | 56 | 56 | 56 | 56 | 56 | 56 | 56 | 56 | 56 | 56 | 56 |

(*1) Exemplified Compounds 2 and 4 were used as a mixture of a mass ratio of 1:1.
(*2) Exemplified Compounds 8 and 10 were used as a mixture of a mass ratio of 1:1.

Each of the liquid compositions shown in Tables 1 and 2 was used to evaluate its strength etc. in the following manner. Each of the liquid compositions of EXAMPLES 1 to 20 and COMPARATIVE EXAMPLES 1 and 8 was applied to a commercially available PET (polyethylene terephthalate) film by means of a bar coater so as to give a coating weight of 20 g/m$^2$. The PET film thus obtained was irradiated with ultraviolet rays using an UV irradiation apparatus to obtain a coating film. An UV lamp used herein was an UV curability evaluation apparatus, Model LH6B (manufactured by FUSION UV Systems Inc.). The intensity at an irradiation position was 1,500 mW/cm$^2$. The conveying speed of the PET film was 0.2 m/sec. The pencil hardness of the film formed in such a manner was measured by means of a commercially available pencil hardness tester, HEIDON-14D (trade name, manufactured by SHINTO SCIENTIFIC CO., LTD.). The measured results are shown in Tables 3 and 4. Incidentally, the pencil hardness test was conducted according to the JIS.

TABLE 3

Measured results of pencil hardness of coating films formed by liquid compositions of EXAMPLES 1 to 10

| Evaluation item | Testing method | EXAMPLE | | | | | | | | | |
|---|---|---|---|---|---|---|---|---|---|---|---|
| | | 1 | 2 | 3 | 4 | 5 | 6 | 7 | 8 | 9 | 10 |
| Pencil hardness | According to JIS | 3H | 3H | 3H | 3H | 3H | 3H | 3H | 3H | 3H | 3H |

TABLE 4

Measured results of pencil hardness of coating films formed by liquid compositions of EXAMPLES 11 to 20

| Evaluation item | Testing method | EXAMPLE | | | | | | | | | |
|---|---|---|---|---|---|---|---|---|---|---|---|
| | | 11 | 12 | 13 | 14 | 15 | 16 | 17 | 18 | 19 | 20 |
| Pencil hardness | According to JIS | 2H | 2H | 2H | 2H | 2H | 2H | 2H | 2H | 2H | 2H |

As shown in the results of EXAMPLES in Tables 3 and 4, practically acceptable pencil hardness was obtained in each coating film irrespective of the non-aqueous liquid compositions of EXAMPLES 1 to 10 and the aqueous liquid compositions of EXAMPLES 11 to 20. Incidentally, None of the films formed with the respective liquid compositions of COMPARATIVE EXAMPLES 1 to 8 was completely fixed to the PET film, and so the measurement of the pencil hardness by the pencil hardness tester could not conducted.

Liquid compositions in the form of an ink were evaluated. First, a cyan pigment dispersion was prepared in the following manner. C.I. Pigment Blue 15:3 was used as a pigment, and a styrene/acrylic acid/ethyl acrylate random polymer (average molecular weight: 3,500, acid value: 150) was used as a dispersant. These materials were dispersed by a bead mill to obtain a cyan pigment dispersion having a pigment solid content of 10% by mass and containing the pigment (P) and the binder (B) at a P/B ratio of 3/1. The average particle size of the pigment as measured by means of a laser light scattering type particle size analyzer (ELS-8000; manufactured by Otsuka Electronics Co., Ltd.) was 120 nm. Their corresponding components shown in Table 5 were mixed and thoroughly stirred, and the resultant mixtures were then filtered under pressure through a filter having a pore size of 0.50 μm, thereby preparing inks according to EXAMPLES 21 to 32, and COMPARATIVE EXAMPLES 9 and 10. Incidentally, the pH of each of the inks was adjusted with a 0.2N aqueous solution of sodium hydroxide so as to finally give pH 8.5. The polymerizable substances used in COMPARATIVE EXAMPLES 9 and 10 were Comparative Compounds 1 and 2 described above.

TABLE 5

Compositions of liquid compositions of EXAMPLES 21 to 32, and COMPARATIVE EXAMPLES 9 and 10 (unit: parts by mass)

| | | EXAMPLE | | | | | | | | | | | | COMP. EX. | |
|---|---|---|---|---|---|---|---|---|---|---|---|---|---|---|---|
| | | 21 | 22 | 23 | 24 | 25 | 26 | 27 | 28 | 29 | 30 | 31 | 32 | 9 | 10 |
| Coloring material | Pigment dispersion | 40 | 40 | 40 | 40 | 40 | 40 | 40 | 40 | 40 | 40 | 40 | 40 | 40 | 40 |
| Polymerizable substance | Exemplified Compound 1 | 15 | | | | | | 25 | | | | | | | |
| | Exemplified Compound 2, 4 (*1) | | 15 | | | | | | 25 | | | | | | |
| | Exemplified Compound 8, 10 (*2) | | | 15 | | | | | | 25 | | | | | |
| | Exemplified Compound 2 | | | | 15 | | | | | | 25 | | | | |
| | Exemplified Compound 8 | | | | | 15 | | | | | | 25 | | | |
| | Exemplified Compound 12 | | | | | | 15 | | | | | | 25 | | |
| | Comparative Compound 1 | | | | | | | | | | | | | 15 | |
| | Comparative Compound 2 | | | | | | | | | | | | | | 15 |
| Polymerization initiator | Exemplified Compound B | | | | | | | 2 | 2 | 2 | 2 | 2 | 2 | | |
| | Exemplified Compound C | 3 | 3 | 3 | 3 | 3 | 3 | | | | | | | 3 | 3 |
| Diluent | HEAA (*3) | 10 | 10 | 10 | 10 | 10 | 10 | | | | | | | 10 | 10 |
| Organic solvent | Ethylene glycol | | | | | | | 10 | 10 | 10 | 10 | 10 | 10 | | |
| Water (ion-exchanged water) | | 32 | 32 | 32 | 32 | 32 | 32 | 23 | 23 | 23 | 23 | 23 | 23 | 32 | 32 |

The solid content of the pigment in each ink was adjusted to 4% by mass.
(*1) Exemplified Compounds 2 and 4 were used as a mixture of a mass ratio of 1:1.
(*2) Exemplified Compounds 8 and 10 were used as a mixture of a mass ratio of 1:1.
(*3) HEAA: hydroxyethylacrylamide.

The respective inks according to EXAMPLES and COMPARATIVE EXAMPLES prepared in the above-described manner were evaluated in the following manner. An On-Demand type ink jet recording apparatus Pixus 550i (manufactured by Canon Inc.) that an ink is ejected by applying thermal energy to the ink according to recording signals was modified so as to have the same construction as that illustrated in FIG. 1. Specifically, an UV lamp 3 that a mercury lamp is exited electrodelessly from the outside using micro waves was installed at a position adjacent to a recording head portion 2 of an ink cartridge 1 equipped with a liquid storage portion storing the active energy ray curable liquid composition according to the present invention. Reference sign '4' designates a drive portion for driving the recording head portion 2 and the UV lamp 3, and reference sign '5' designates a paper discharge portion for conveying a recording medium. This modified ink jet recording apparatus was used to evaluate the respective inks according to the evaluation methods and evaluation standards described in the following (1) to (3). As the UV lamp, was used a D bulb. The intensity at an irradiation position was 1,500 mW/cm$^2$.

(1) Curing Performance of Ink
(1)-1: Fixing Ability
Each of the cyan inks of EXAMPLES 21 to 32, and COMPARATIVE EXAMPLES 9 and 10 prepared previously, and the above-described modified ink jet recording apparatus were used to form a 100% solid image on paper for offset recording, OK Kinfuji (product of OJI PAPER Co.). The recording medium was irradiated with ultraviolet rays by the UV irradiation apparatus under the same conditions as in the above-described case where the liquid composition was applied. After 10 seconds from the recording, silbon paper was placed on the recording medium and pulled under the condition where a weight having a load of 40 g/cm$^2$ was placed on the recorded surface. As a result, whether stain was caused on a non-printed area (blank area) of the recording medium and the silbon paper by rubbing of the printed area or not was visually observed to make evaluation as to fixing ability. The evaluation standard of the fixing ability is as follows. The evaluated results are shown in Table 6.
A: No stained area by rubbing is observed;
B: A stained area by rubbing is scarcely observed;
C: A stained area by rubbing is conspicuous.
(1)-2: Highlighter Resistance
Each of the cyan inks of EXAMPLES 21 to 32, and COMPARATIVE EXAMPLES 9 and 10, and the above-described modified ink jet recording apparatus were used to record characters of 12 points on PPC paper (product of Canon Inc.). After 1 minute from the recording, a character-recorded area was marked once under an ordinary writing pressure with a fluorescent pen, Spot Writer Yellow (manufactured by Pilot Pen Co., Ltd.), whereby whether damage of the characters was caused or not was visually observed to make evaluation as to highlighter resistance. The evaluation standard of the highlighter resistance is as follows. The evaluated results are shown in Table 6.
A: No damage of characters by the highlighter is caused;
B: Damage of characters by the highlighter is slightly caused;
C: Damage of characters by the highlighter is markedly caused.
(2) Ejection Stability
Each of the cyan inks of EXAMPLES 21 to 32, and COMPARATIVE EXAMPLES 9 and 10, and the above-described modified ink jet recording apparatus were used to continuously record ruled lines on PPC paper (product of Canon Inc.). Thereafter, the line size and impact positions of dots with respect to the resultant image were visually observed to make evaluation as to the ejection stability. The evaluation standard of the ejection stability is as follows. The evaluated results are shown in Table 6.
A: No change in line size and no dot misalignment are observed;
B: The line is somewhat thickened;
C: The line is thinned, and dot misalignment is somewhat observed.
(3) Storage Stability
Each of the cyan inks of EXAMPLES 21 to 32, and COMPARATIVE EXAMPLES 9 and 10 was placed in a Teflon (trademark) container and hermetically sealed. The ink was stored for one month in an oven of 60° C. at a dark place. The average particle sizes of the pigment before and after the storage were compared to make evaluation as to the storage stability. The evaluation standard of the storage stability is as follows. The evaluated results are shown in Table 6.
A: Change in average particle size is within ±10% before and after the storage;
B: Change in average particle size exceeds ±10%, but is within ±15% before and after the storage;
C: Change in average particle size exceeds 15% before and after the storage.

TABLE 6

Evaluated results

| | | EXAMPLE | | | | | | | | | | | | COMP. EX. | |
|---|---|---|---|---|---|---|---|---|---|---|---|---|---|---|---|
| | | 21 | 22 | 23 | 24 | 25 | 26 | 27 | 28 | 29 | 30 | 31 | 32 | 9 | 10 |
| Curing performance of ink | Fixing ability | A | A | A | A | A | A | A | A | A | A | A | A | A | B |
| | Highlighter resistance | A | A | A | A | A | A | A | A | A | A | A | A | B | B |
| Ejection stability | | A | A | A | A | A | A | A | A | A | A | A | A | C | C |
| Storage stability | | A | A | A | A | A | A | A | A | A | A | A | A | C | C |

Example 33

A yellow pigment dispersion and a magenta pigment dispersion were prepared in exactly the same manner as in the preparation of the cyan pigment dispersion used in EXAMPLE 21.
(Preparation of Yellow Pigment Dispersion)
A yellow pigment dispersion having a pigment solid content of 10% by mass, a P/B ratio of 3/1 and an average particle size of 130 nm was prepared in exactly the same manner as in the preparation of the cyan pigment dispersion except that C.I. Pigment Yellow 13 was used as the pigment.
(Preparation of Magenta Pigment Dispersion)
A magenta pigment dispersion having a pigment solid content of 10% by mass, a P/B ratio of 3/1 and an average particle size of 125 nm was prepared in exactly the same manner as in the preparation of the cyan pigment dispersion except that C.I. Pigment Red 122 was used as the pigment.
A yellow ink according to EXAMPLE 33 was then prepared in exactly the same manner as in EXAMPLE 21 except that the cyan pigment dispersion was changed to the yellow pigment dispersion obtained above. A magenta ink according to EXAMPLE 33 was prepared in exactly the same manner as in EXAMPLE 21 except that the cyan pigment dispersion was changed to the magenta pigment dispersion obtained above.
An ink set according to EXAMPLE 33 was provided by combining the cyan ink according to EXAMPLE 21 with the yellow ink and magenta ink obtained above. This ink set and the same modified ink jet recording apparatus as that used in EXAMPLE 21 were used to record images on paper for offset recording, OK Kinfuji (product of OJI PAPER Co.). Specifically, images respectively formed by 100% solid recording of yellow and 100% solid recording of magenta as well as an image of a second color of red formed by 100% solid recording of yellow and 100% solid recording of magenta were recorded. With respect to portions of yellow, magenta and red in the images formed in such a manner, the fixing ability was evaluated according to the same method and evaluation standard as in EXAMPLE 21. Incidentally, the results were shown as EXAMPLES 39Y, 39M and 39R. With respect to the yellow ink and magenta ink, the ejection stability and storage stability were evaluated according to the same methods and evaluation standards as in EXAMPLE 21. The evaluated results are shown in Table 7.

TABLE 7

Evaluated results of the ink set of EXAMPLE 33

| | EXAMPLE | | |
|---|---|---|---|
| | 33Y | 33M | 33R |
| Fixing ability | A | A | A |
| Ejection stability | A | A | — |
| Storage stability | A | A | — |

As described above, according to the present invention, curability by the active energy rays is good even in any of the aqueous and non-aqueous forms, and practical curing performance is achieved even in the form of the ink containing the coloring material. Further, according to the present invention, inks and liquid compositions excellent in the fixing ability and highlighter resistance of images formed therefrom and also excellent in the ejection stability and storage stability thereof can be provided. Incidentally, the EXAMPLES described above are given for explaining the fundamental constitution of the present invention, and it is needless to say that even when a dye is used as the coloring material, an ink having the same performance as in the EXAMPLES can be provided.

This application claims the benefit of Japanese Patent Application No. 2007-086761, filed Mar. 29, 2007, which is hereby incorporated by reference herein in its entirety.

The invention claimed is:

1. An active energy ray curable liquid composition comprising a compound represented by the following formula:

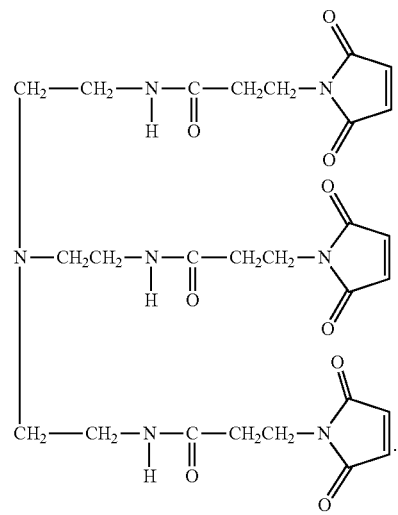

2. A liquid cartridge comprising a liquid storage portion storing the active energy ray curable liquid composition according to claim 1.